United States Patent Office
3,200,114
Patented Aug. 10, 1965

3,200,114
17 - TETRAHYDROPYRANYL ETHERS OF (3,2 - c)-
PYRAZOLE AND (2,3 - d) - ISOXAZOLE DERIVA-
TIVES OF THE ANDROSTANE AND 19-NORAN-
DROSTANE SERIES
Alexander D. Cross, Mexico City, Mexico, assignor to Syntex Corporation, Panama, Panama, a corporation of Panama
No Drawing. Filed Nov. 12, 1963, Ser. No. 323,120
Claims priority, application Mexico, Feb. 28, 1963, 71,076
6 Claims. (Cl. 260—239.55)

This invention relates to novel cyclopentanopolyhydrophenanthrene derivatives and to processes for the preparation thereof.

More particularly, this invention relates to novel 17-tetrahydropyranyl ethers of [3,2-c]-pyrazole and [2,3-d]-isoxazole derivatives of the androstane and 19-norandrostane series represented by the general formulas:

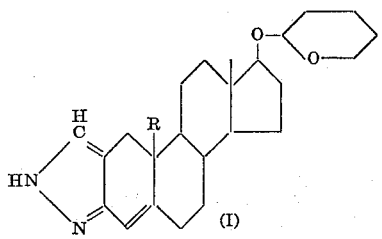

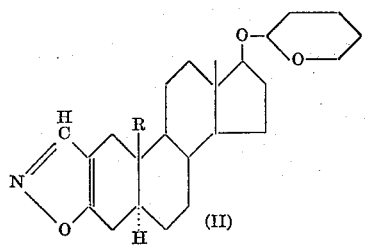

In these formulas R represents hydrogen or methyl.

A considerable amount of research in the steroid field has been done in the area of anabolic agents, inasmuch as such compounds are useful in many areas of human and veterinary medicine. Thus, for example, an important application of anabolic agents in human therapy is in cases where the patient suffers from any of a number of debilitating diseases or conditions which produce a negative nitrogen balance, such as deficient nutrition or growth, chronic cachetic diseases, and osteoporosis, wherein it is necessary to increase the metabolism of proteins and obtain a positive nitrogen balance and greater deposition of calcium in bone tissues. Similarly, anabolic agents are extremely useful in the post-operative treatment of patients recovering from major surgical operations.

It is known that androstane derivatives such as testosterone, 19-nortestosterone and various substituted derivatives thereof exhibit good anabolic activity when administered parenterally, and that this is particularly the case with 17α-alkyl substituted derivatives such as 17α-methyltestosterone, 6α,17α - dimethyltestosterone, 2 - hydroxymethylene - 17α-methyldihydroallotestosterone, 2α,17α-dimethyldihydroallotestosterone, and the like. Similarly, it is known that [3,2-c]-pyrazole and [2,3-d]-isoxazole derivatives of the androstane series have anabolic activity. However, it is also known that androstane derivatives of the type in question which do not have a 17α-alkyl substituent exhibit either very low anabolic activity or no anabolic activity at all when administered orally.

The present invention is based on the surprising and unexpected discovery that the 17-tetrahydropyranyl ethers of [3,2-c]-pyrazole and [2,3-d]-isoxazole derivatives of the androstane and 19-norandrostane series represented by the above general formulas, unlike the corresponding 17-unetherified compounds, exhibit good anabolic activity when administered orally. In addition, the androgenic activity of these 17β-tetrahydropyranyloxy derivatives is low. Thus, when their anabolic/androgenic activity is measured by administering them orally to castrated young male rats and then determining the response to this treatment by increases in the weights of the ventral prostate, seminal vesicles and levator ani muscle, it is found that these 17-tetrahydropyranyl ethers possess very low androgenic activity, while their anabolic activity is markedly greater than that of testosterone.

These novel 17-tetrahydropyranyl ethers also possess anti-estrogenic activity, lower blood cholesterol levels, and inhibit the secretion of gonadotrophins by the pituitary gland.

The novel 17β-tetrahydropyranyloxy derivatives of the present invention are obtained from the corresponding 17β-hydroxy steroids by conventional methods of preparing tetrahydropyranyl ethers of steroids having free hydroxyl groups. Thus, the free 17β-hydroxyl-containing parent compound can be reacted, under substantially anhydrous conditions, with an excess of dihydropyran in the presence of a small amount of an acidic catalyst, e.g., hydrochloric acid, p-toluenesulfonic acid, boron trifluoride etherate, and the like, either alone or together with an inert organic solvent, such as benzene, diethyl ether, or the like, at a temperature of from about 0° C. to about 50° C., and preferably at room temperature (about 25° C.), for from about 1 hour to about 72 hours.

These novel compounds can be administered in any of a number of conventional pharmaceutical forms, and particularly in ones suited for oral administration, e.g., in solid form, such as in pills, powders, capsules, tablets, or the like, or in liquid form, as syrups, emulsions, suspensions, and the like.

In order that those skilled in the art can more fully understand the present invention, the following examples are set forth. These examples are given solely for the purpose of illustrating the invention, and should not be considered as expressing limitations unless so set forth in the appended claims.

PREPARATION A

A mixture of 10 grams of 19-nortestosterone, 80 cc. of anhydrous thiophene-free benzene, 2 cc. of ethyl formate and 1.5 grams of sodium hydride was maintained for 8 hours, with stirring, under an inert nitrogen atmosphere. Following this reaction period the sodium salt of 2-hydroxymethylene-19-nor-Δ⁴-androsten - 17β-ol-3-one was filtered from the reaction mixture, washed with benzene and then with hexane, and then dried under vacuum. Cautious precipitation of this sodium salt in an excess of ice-cold dilute aqueous hydrochloric acid gave the corresponding crude, free 2-hydroxymethylene derivative, which was then filtered off, washed with water and air dried. Recrystallization from methanol gave pure 2-hydroxymethylene-19-nor-Δ⁴-androsten-17β-ol-3-one.

PREPARATION B

A mixture of 5 grams of 2-hydroxymethylene-19-nor-Δ⁴-androsten-17β-ol-3-one, 300 cc. of ethanol and 2 grams of hydrazine hydrate was refluxed for 3 hours. Following this reaction period the mixture was concentrated to a small volume and diluted with water. The resulting precipitate was collected by filtration, washed with water and air-dried. Recrystallization from methanol gave pure 17β-hydroxy-19-nor-Δ⁴-androsten-[3,2-c]-pyrazole.

PREPARATION C

A mixture of 2-hydroxymethylene-19-nordihydroallotestosterone, 5 grams of hydroxylamine hydrochloride, 2.5 grams of sodium acetate and 300 cc. of methanol was refluxed for 3 hours. Following this reaction period the mixture was concentrated to a small volume under vacuum, cooled, and then poured into water. The resulting precipitate was collected by filtration, washed with water and air-dried. Recrystallization from methanol gave pure 17β-hydroxy-19-nor-androstan-[2,3-d]-isoxazole.

*Example*

To a solution of 1 gram of 17β-hydroxy-Δ⁴-androsten-[3,2-c]-pyrazole in 25 cc. of benzene there was added 2 cc. of dihydropyran. Next, approximately 5 cc. of the mixture of benzene and dihydropyran was filtered off to remove moisture, and the remaining mixture was then cooled to room temperature. To the cooled mixture there was then added 0.1 gram of p-toluenesulfonic acid, and the resulting reaction mixture was held at room temperature for 72 hours. Following this reaction period the reaction mixture was washed with an aqueous 5% sodium carbonate solution and then with water until neutral, then dried over anhydrous sodium sulfate and evaporated to dryness. The dry residue was then chromatographed by passing it, dissolved in hexane, through a column of neutral alumina, thus giving the 17-tetrahydropyranyl ether of 17β-hydroxy-Δ⁴-androsten-[3,2-c]-pyrazole.

By repeating this procedure in every detail but one, namely, replacing 17β-hydroxy-Δ⁴-androsten-[3,2-c]-pyrazole with 17β-hydroxy-19-nor-Δ⁴-androsten-[3,2-c]-pyrazole, 17β-hydroxyandrostan-[2,3-d]-isoxazole and 17β-hydroxy-19-norandrostan-[2,3-d]-isoxazole, respectively, the corresponding 17-tetrahydropyranyl ethers, namely 17β-tetrahydropyranyloxy - 19 - nor-Δ⁴-androsten-[3,2-c]-pyrazole, 17β - tetrahydropyranyloxyandrostan - [2,3-d]-isoxazole and 17β-tetrahydropyranyloxy-19-norandrostan-[2,3-d]-isoxazole, respectively, were obtained.

I claim:
1. A compound represented by the formula:

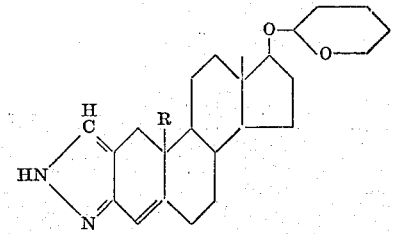

wherein R is selected from the group consisting of hydrogen and methyl.

2. The 17-tetrahydropyranyl ether of 17β-hydroxy-Δ⁴-androsten-[3,2-c]-pyrazole.

3. The 17-tetrahydropyranyl ether of 17β-hydroxy-19-nor-Δ⁴-androsten-[3,2-c]-pyrazole.

4. A compound represented by the formula:

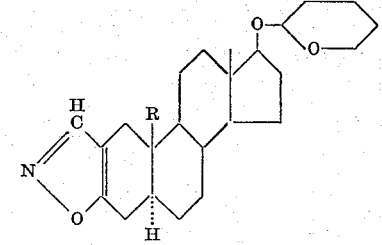

wherein R is selected from the group consisting of hydrogen and methyl.

5. The 17-tetrahydropyranyl ether of 17β-hydroxyandrostan-[2,3-d]-isoxazole.

6. The 17-tetrahydropyranyl ether of 17β-hydroxy-19-norandrostan-[2,3-d]-isoxazole.

References Cited by the Examiner

Alauddin et al., "J. Pharm. and Pharmacol.," vol. 14, No. 6, June 1962, pages 325–348.

Manson et al., "J. Med. Chem.," vol. 6, No. 1, January 18, 1963, pages 1–9.

LEWIS GOTTS, *Primary Examiner.*